United States Patent Office

2,976,320
CATALYTIC HYDROGENATION OF THE DINITRO DERIVATIVES OF TOLUENE

Leon O. Winstrom and Roger D. Samdahl, East Aurora, and Philip S. Perch, Buffalo, N.Y., assignors to Allied Chemical Corporation, a corporation of New York No Drawing. Filed July 30, 1957, Ser. No. 675,015

8 Claims. (Cl. 260—580)

The present invention relates to a process for the catalytic hydrogenation of the dinitro derivatives of toluene to the corresponding diamines in the absence of solvents or diluents.

Diaminotoluenes are important industrial chemicals for dyes, antioxidants, etc. Recently, the m- and p-diamino compounds have become additionally important as intermediates for manufacturing the corresponding diisocyanates, which are starting materials for polyurethane resins and plastics. These new, large scale outlets have made it imperative to develop improved methods for producing these diamines on a commercial scale over the traditional method involving reaction of the corresponding dinitro hydrocarbon with inorganic reducing agents, notably iron and acid.

A number of methods have been hitherto proposed for the catalytic hydrogenation of dinitro compounds, which is potentially a most attractive and economical process for manufacturing the diamines. These methods are generally characterized by hydrogenation of the dinitro compound in the liquid phase in the presence of a solvent or diluent. For large scale operations, however, the use of an organic solvent is disadvantageous, since it reduces equipment capacity, entails costly recovery of solvent and presents a safety hazard resulting from mixtures of the unstable, strongly oxidizing dinitro compounds with the organic solvent, e.g. alcohol.

To overcome these disadvantages and hazards it has been proposed to effect the hydrogenation of the dinitro compounds at a temperature not exceeding 100° C. by introducing the dinitro compound in small increments and hydrogen to an aqueous suspension of a palladium or platinum catalyst; or by hydrogenating the dinitro compound, dissolved in methanol, in a continuous manner at a temperature between 80° and 120° C. at a pressure above 50 atm. in the presence of Raney nickel. Hydrogenation of dinitrotoluenes at temperatures much above 100° C. has been considered hazardous even in aqueous suspension, and unfeasible under ordinary pressures.

In accordance with the present invention, the reduction of a dinitrotoluene to the corresponding diamine by catalytic hydrogenation is carried out at a temperature as high as 150° C. or higher with the dinitrotoluene in the molten form as the reaction medium and containing not more than 500 p.p.m., and preferably not more than 200 p.p.m. (by weight) of nitrophenols.

We have discovered that nitrophenols and nitrocresols normally present in commercial dinitrotoluenes are powerful catalyst poisons and decomposition accelerators and that their concentration in such dinitro products is critically related to the safety and efficiency with which the dinitrotoluenes can be hydrogenated to the corresponding diamines. We have found, in accordance with the present invention, that by limiting the content of nitrophenols and nitrocresols in the said dinitrotoluenes to not more than 500 p.p.m., and preferably not more than 200 p.p.m., the latter can be hydrogenated safely and efficiently under ordinary or slightly elevated pressures in the molten state at temperatures as high as 150° C., and preferably between 90° C. and 135° C. in large scale batch operations, and at even higher temperatures in continuous operations where the contact time is relatively short, in the presence of a hydrogenation catalyst, such as nickel, palladium and platinum. During this process it is desirable to remove the water of reaction as formed, since the presence thereof adversely affects the hydrogenation reaction and catalyst activity, as is well known.

Ordinarily, the dinitro derivatives of toluene are obtained commercially by nitration of toluene or mononitrotoluenes with mixed acid. The crude dinitro products are separated from the spent nitration acid and usually washed, first with dilute aqueous alkali (e.g., sodium carbonate solution) to remove acidic impurities and then with water until alkali-free. If the nitration is performed in the usual cast iron equipment, the dinitro product obtained after washing usually still contains more than 1000 p.p.m. of nitrophenols. (Hereinafter the term "nitrophenols" is meant to be generic to nitrophenolic substances including nitrocresols.) It appears that iron from such equipment reacts or combines with nitrophenol and nitrocresol impurities to form complex substances which are not extracted from the dinitrotoluenes by washing with alkali or water. However, by extracting such crude dinitro compounds with dilute aqueous nitric acid, which removes the iron, prior to washing with alkali and water, or by carrying out the nitration and subsequent operations in equipment which does not introduce ionizable iron salts reactive with nitrophenols, such as stainless steel 316, it has been found possible to obtain washed dinitro products containing less than 100 p.p.m. of nitrophenols.

In carrying out the process of the present invention, vigorous agitation and cooling of the reaction mixture are preferably employed to assure intimate contact between catalyst, hydrogen and nitro compound, and to maintain relatively uniform temperatures throughout the reaction mixture in view of the strongly exothermic nature of the reaction and potential instability of the mixture. The stability to heat of synthetic mixtures of purified dinitrotoluenes and tolylenediamines is lowest when these compounds are present in about equal parts by weight. Such mixtures may suddenly char after being heated for example at 125° C. for about 100 hours or for shorter periods at higher temperatures. By controlling the nitrophenols content in accordance with the cresent invention, the dinitrotoluene and the reaction mixture tend to be stabilized and the catalyst activity and reaction rate are maintained at high levels, thereby insuring a wire margin of safety through this potentially critical period. For example, as shown in the following specific examples, the entire hydrogenation reaction may be completed at 125° C. in less than 20 hours. The extremely low formation of tars, obtained as residue when the diamines produced are distilled, gives further evidence that decomposition reactions are minimized in the process of the present invention.

The process of our invention provides the following important advantages:

(1) Eliminates the use of costly solvents and diluents.

(2) Provides maximum output per unit of reactor volume.

(3) Produces diamine of high purity (free from nitro products) in excellent (practically theoretical) yields.

(4) Reduces consumption of catalyst.

(5) Provides a rapid hydrogenation reaction.

(6) Eliminates the use of elevated hydrogenation pressures and special equipment required therefor.

(7) Permits readily controllable, safe processing even in large batch operations.

The invention will be illustrated by the following specific examples, but it is to be understood that the invention is not limited to their details and that changes may be made without departing from its scope. The temperatures are in degrees centigrade and the parts and percentages are by weight.

Example 1

Part A.—The dinitrotoluene starting material used in this example contained 99% dinitrotoluene consisting of a mixture of 2,4-dinitrotoluene and 2,6-dinitrotoluene in the ratio of about 4:1, about 1% water, 100 p.p.m. nitrophenols, and less than 20 p.p.m. mineral acidity.

The hydrogenator used was a low pressure, 4,000 gal. tank of stainless steel 316. It was 8 feet in diameter, 10 feet high with dished top and bottom. It was provided inter alia with:

(a) Helical cooling coils arranged close to the inner wall of the tank. Under the process conditions described below, the coils contained circulating water at 90° and provided a cooling rate of about 5 million B.t.u. per hour.

(b) Four vertical baffles extending from top to bottom of the straight wall of the hydrogenator and mounted radially 90° apart just inside the cooling coils, (c) A single impeller agitator of conventional design 40 inches in diameter rotating about 40 inches above the dished bottom of the tank. During process conditions described below, the impeller was rotated at about 110 r.p.m., (d) A dip-leg for the introduction of the hydrogen, terminating just above the center of the dished tank bottom, and (e) Temperature recording devices (thermocouples) at three different horizontal levels, so as to permit determination of temperatures at points not more than 2 feet apart anywhere in the reaction mixture; and temperature control devices in vertical wells, which were automatically actuated when maximum temperatures were exceeded, to control the reaction by introduction of inert gas (nitrogen) or water.

29,000 lbs. of molten dinitrotoluene (at 80°) were charged to the hydrogenator, wherein an atmosphere of hydrogen was maintained. A slurry of 43.5 lbs. of palladium on charcoal catalyst, in 2000 lbs. of deionized water was then charged to the hydrogenator.

The mixture of dinitrotoluene and catalyst-water slurry was agitated at 80° at 20 p.s.i. hydrogen pressure. The temperature of the mixture was then raised to 96–98° while passing a stream of hydrogen therethrough at about 200–400 cu. ft./min. to remove all water introduced with the catalyst slurry.

When all water had been distilled off, as indicated by start of heat evolution in the hydrogenator, the hydrogen flow was increased to 600 cu. ft./min. and the temperature in the hydrogenator was raised slowly to 114–116° during about half an hour. Agitation speed was increased, and hydrogenation at 114–116° was continued, during which water of reaction distilled off as formed until a hydrogen absorption "break" occurred (about 20 hours). (The hydrogen absorption "break" occurs when the hydrogen flow from the hydrogenator is almost equal to hydrogen input and the heat of reaction is insufficient to maintain a temperature of 114–116°. When this point is reached steam heating of the hydrogenator is necessary to maintain the temperature.)

Hydrogenation was continued thereafter for 5 hours. Samples were removed to make color determinations for completeness of reduction. The samples were distilled under 10 mm. Hg pressure through a packed column and the color of the collected distillate was noted. The hydrogenation was complete when the distillate had a color of 0.5 or less on the Barrett scale, corresponding to much less than 100 p.p.m. of nitro compounds.

The hydrogenator contents were cooled to 98–100° and the hydrogen flow was reduced to about 10–15 cu. ft./min. to maintain a positive hydrogen atmosphere and to prevent decomposition of the tolylenediamine. The contents were then sludge-filtered to remove the catalyst.

The tolylenediamine thus obtained as filtrate was of 99% strength (the remainder being essentially water) and corresponded in amount to 98% of the theoretical yield.

The recovered catalyst after being washed with dilute aqueous (2%) oxalic acid, was reused to hydrogenate a minimum of one further charge of dinitrotoluene as above with identical results.

Part B.—For purposes of comparison, a 2,4-dinitrotoluene containing about 1,000 p.p.m. nitrocresols was hydrogenated in molten state at 115°, with the foregoing palladium on charcoal catalyst. The hydrogenation was slow and gave rise to large amounts of decomposition products. The diamine product obtained was dark and impure, and amounted to less than 70% of the theoretical yield. The decomposition under these conditions, when the concentration of nitrocresols in the dinitrotoluene materially exceeds 500 p.p.m., although slow, may be accelerated by increased concentration of nitrocresols and temperatures, e.g. local overheating, which may lead to sudden decomposition accompanied by uncontrollable charring and gas evolution. Accordingly, such processes are unsuitable and unsafe for commercial operations. Further, while for safe operation the concentration of nitrocresols in the dinitro starting material should not generally exceed 500 p.p.m., it is preferably not greater than 200 p.p.m., to avoid large and uneconomical consumption of expensive catalyst and/or unduly slow reaction and to further insure safety of operation.

Example 2

By carrying out the foregoing Example 1 at 125°, the hydrogenation was completed in less than 20 hours, the yield and quality of tolylenediamine being the same.

Examples 3 and 4

Essentially identical results were obtained by the process of Example 1 in hydrogenating a dinitrotoluene consisting wholly of 2,4-dinitrotoluene (Example 3), or a commercial mixture composed of 65% 2,4-isomer and 35% 2,6-isomer (Example 4), each containing 100 p.p.m. of nitrophenols, to the corresponding tolylenediamine products.

Example 5

In place of the palladium catalyst used in Example 1, a nickel on silica catalyst containing about 18% of nickel was employed in the process of Example 1, the amount of nickel being 100 times greater than the amount of palladium used in Example 1. The hydrogenation was complete in about 30 hours and the yield and purity of tolylenediamine obtained were essentially the same as obtained in Example 1.

The total nitrocresol content of dinitrotoluene samples can be determined polarographically by extracting the nitrocresols from the samples in aqueous sodium hydroxide solution and making a polarogram of the extract, containing added monopotassium phosphate ($KH_2PO_4$) as a supporting electrolyte, using a dropping mercury vs. standard calomel electrode system. (The expression "nitrocresol content" as used herein should be understood to be inclusive of mono- and dinitrocresols and nitrophenols.) Under the conditions of this analytical procedure, the total nitrocresol content may be determined in a single analysis because (1) the diffusion currents of the individual nitrocresols (and nitrophenols) are directly proportional to their respective concentrations and are sufficiently similar in magnitude and (2) the half wave potentials of the components (including the half wave potential of the first wave of the dinitrocresol polarogram) are very close together and are within the range —0.39 to —0.45 volt. Accordingly, polarograms of samples show only one wave; this is, arbitrarily, calculated and expressed as m-nitro-p-cresol (which has a half wave potential of —0.42 volt under the conditions of the analysis).

The sample should be free of nitric acid and nitrates or abnormally high results will be obtained. If such nitrates or nitric acid are present, the material has been insufficiently washed.

Samples of the dinitrotoluenes employed in the above examples were polarographed as follows: A solution of 25 g. of the dinitrotoluene sample in circa 175 ml. of benzene was extracted successively with one 50 ml. and two 25 ml. portions of N/10 sodium hydroxide solution; the combined extracts were acidified with 20 ml. of N/1 hydrochloric acid and extracted with two successive 50 ml. portions of benzene; the combined benzene extracts were extracted with three 25 ml. portions of N/10 sodium hydroxide solution; the combined sodium hydroxide solution extracts were extracted with 50 ml. of benzene, which was discarded, and then diluted to 100 ml. by addition of N/10 NaOH; a 25 ml. aliquot of this solution was diluted to 100 ml. with 1% monopotassium phosphate solution.

The solution was then polarographed according to the standard procedure, using a dropping mercury vs. standard calomel electrode system. The applied electromotive forces had a range of values inclusive of the range —0.39 to —0.45 volt.

A reference sample comprising 25 g. of high purity 2,4-dinitrotoluene containing 0.003 g. of m-nitro-p-cresol was simultaneously carried through the same extraction and polarographing procedure as were the samples being analyzed. (The dinitrotoluene was previously analyzed to assure that it was free of nitrocresol.) Polarograms of the reference and unknown samples were then compared.

The number of parts per million of nitrocresols in the unknown sample, calculated as m-nitro-p-cresol, was then given by the expression $$120 \times \frac{\text{wave height of unknown}}{\text{wave height of standard}}$$

We claim:

1. The improvement in the method of reducing dinitrotoluene to the corresponding diamine by catalytic hydrogenation, which comprises carrying out the hydrogenation with the dinitrotoluene in the molten form as the reaction medium and containing not more than 500 p.p.m. of nitrophenols.

2. A method of reducing dinitrotoluene to the corresponding diamine by catalytic hydrogenation, which comprises introducing hydrogen into a suspension of a hydrogenation catalyst in dinitrotoluene in the molten form as the reaction medium and containing not more than 200 p.p.m. of nitrophenols at a temperature not exceeding about 150° C. while removing water formed in the hydrogenation.

3. A method of reducing dinitrotoluene to the corresponding diamine by catalytic hydrogenation, which comprises passing an excess of hydrogen through a suspension of a hydrogenation catalyst in dinitrotoluene in the molten form and containing not more than 500 p.p.m. of nitrophenols while maintaining the temperature of the suspension between 90° and 150° C., and removing jointly with the excess hydrogen, water formed in the hydrogenation.

4. A method as defined in claim 3, wherein the dinitrotoluene contains not more than 200 p.p.m. of nitrophenols.

5. A method of reducing dinitrotoluene to tolylenediamine by catalytic hydrogenation, which comprises passing an excess of hydrogen through a suspention of a palladium hydrogenation catalyst in dinitrotoluene in the molten form as the reaction medium and containing not more than 200 p.p.m. of nitrophenols while maintaining the temperature of the suspension between 90° and 135° C. and while removing jointly with the excess hydrogen, water formed in the hydrogenation.

6. A method of producing tolylene diamine by catalytic hydrogenation of dinitrotoluene, which comprises mixing a hydrogenation catalyst with dinitrotoluene which is in the molten form and contains not more than 500 p.p.m. of nitrophenols, passing an excess of hydrogen into the mixture while maintaining the temperature of the mixture between 90° and 150° C., whereby tolylene diamine is produced, and vaporizing and removing jointly with the excess hydrogen, water formed in the hydrogenation.

7. A method of producing tolylene diamine by catalytic hydrogenation of dinitrotoluene, which comprises mixing a palladium hydrogenation catalyst with dinitrotoluene which is in the molten form and contains not more than 200 p.p.m. of nitrophenols, passing an excess of hydrogen into the mixture while maintaining the temperature of the mixture at 90° to 135° C., whereby tolylene diamine is produced, and vaporizing and removing jointly with the excess hydrogen, water formed in the hydrogenation.

8. A method of producing tolylene diamine by catalytic hydrogenation of dinitrotoluene, which comprises mixing an aqueous slurry of palladium on charcoal catalyst with molten dinitrotoluene which contains not more than 200 p.p.m. of nitrophenols, passing hydrogen through the mixture while heating it to 96°–98° C., to remove the water introduced with the slurry, then passing an excess of hydrogen through the mixture while at a higher temperature not exceeding 135° C., whereby tolylene diamine is produced and water formed in the hydrogenation is removed jointly with the excess hydrogen, and separating the catalyst from the resulting tolylene diamine.

References Cited in the file of this patent

UNITED STATES PATENTS

| | | |
|---|---|---|
| 1,849,428 | Laux | Mar. 15, 1932 |
| 2,131,734 | Henke et al. | Oct. 4, 1938 |
| 2,526,913 | Teeters | Oct. 24, 1950 |
| 2,619,503 | Benner et al. | Nov. 25, 1952 |
| 2,823,235 | Graham | Feb. 11, 1958 |

FOREIGN PATENTS

| | | |
|---|---|---|
| 476,666 | Canada | Sept. 4, 1951 |
| 508,597 | Canada | Dec. 28, 1954 |
| 559,732 | France | June 21, 1923 |
| 16,936 | Great Britain | July 23, 1914 |